United States Patent
Abdo et al.

(10) Patent No.: US 9,454,061 B1
(45) Date of Patent: Sep. 27, 2016

(54) QUANTUM COHERENT MICROWAVE TO OPTICAL CONVERSION SCHEME EMPLOYING A MECHANICAL ELEMENT AND A SQUID

(71) Applicant: International Business Machines Corporation, Armonk, NY (US)

(72) Inventors: Baleegh Abdo, Carmel, NY (US); Jared B. Hertzberg, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/972,942

(22) Filed: Dec. 17, 2015

(51) Int. Cl.
*G02F 1/35* (2006.01)
*G02B 26/00* (2006.01)
*H01P 7/00* (2006.01)
*H01P 11/00* (2006.01)
*H01S 3/108* (2006.01)

(52) U.S. Cl.
CPC .............. *G02F 1/353* (2013.01); *G02B 26/002* (2013.01); *H01P 7/00* (2013.01); *H01P 11/008* (2013.01); *H01S 3/108* (2013.01)

(58) Field of Classification Search
CPC ........... G02F 1/353; G02F 2001/3542; G02F 2201/17; H01S 3/108
See application file for complete search history.

(56) References Cited

U.S. PATENT DOCUMENTS

| | | | | |
|---|---|---|---|---|
| 5,029,173 A | * | 7/1991 | Seguin | H01S 3/0315 372/23 |
| 5,058,431 A | * | 10/1991 | Karwacki | G01P 9/00 324/248 |
| 5,130,994 A | * | 7/1992 | Madey | H01S 3/0903 372/108 |
| 7,889,992 B1 | | 2/2011 | DiVincenzo et al. | |
| 8,117,000 B2 | * | 2/2012 | DiVincenzo | B82Y 10/00 702/72 |
| 8,639,074 B2 | | 1/2014 | Tang et al. | |
| 8,849,075 B2 | | 9/2014 | Painter et al. | |
| 2007/0120563 A1 | * | 5/2007 | Kawabata | G01R 33/0354 324/244.1 |
| 2014/0314419 A1 | | 10/2014 | Paik | |
| 2015/0060756 A1 | | 3/2015 | Park | |

OTHER PUBLICATIONS

R.W. Andrews, et al.,"Bidirectional and Efficient Conversation Between Microwave and Optical Light", Nature Physics, vol. 10, No. 4, 2014, pp. 1-7.
Flowers-Jacobs, N. E. et al., "Fiber-cavity-based optomechanical device," Appl. Phys. Lett. 101, 221109 (2012), pp. 1-5.
(Continued)

*Primary Examiner* — Daniel Petkovsek
(74) *Attorney, Agent, or Firm* — Cantor Colburn LLP; Vazken Alexanian

(57) ABSTRACT

A technique relates to frequency conversion. A mechanical resonator is configured to oscillate at a mechanical resonance frequency with a displacement in an axis. An optical resonator includes a first mirror opposite a second mirror in which an optical cavity is formed between. The first mirror is fixed to the mechanical resonator such that the first mirror is moved to change an optical length of the optical cavity according to the displacement of the mechanical resonator. Changing the optical length changes an optical resonance frequency of the optical resonator. A microwave resonator is positioned to move according to the displacement of the mechanical resonator such that moving the mechanical resonator changes a Josephson inductance of the microwave resonator, thereby changing a microwave resonance frequency of the microwave resonator.

25 Claims, 10 Drawing Sheets

(56) References Cited

OTHER PUBLICATIONS

J. Bochmann, et al., "Nanomechanical coupling between microwave and optical photons", Nature Physics, vol. 9, No. 11, Sep. 15, 2013, pp. 1-5.

J.M Jaycox, et al., "Planar coupling scheme for ultra low noise DC SQUIDs," IEEE Transactions on Magnetics, vol. 17, Issue 1, Jan. 1981, pp. 400-403.

K. Xia, et al., "An opto-magneto-mechanical quantum interface between distant superconducting qubits", Scientific Reports, vol. 4, No. 557, Jul. 4, 2014, pp. 1-5.

S. Groblacher, et al.,"Demonstration of an ultracold micro-optomechanical oscillator in a cryogenic cavity", Nature Physics,vol. 5, No. 7, Sep. 23, 2009, pp. 1-7.

S.J. Weber, et al.,"Single crystal silicon capacitors with low microwave loss in the single photon regime", Nature Science, vol. 2, Apr. 19, 2011, pp. 1-3.

Z.Q. Yin, et al., "Quantum network of superconducting qubits through opto-mechanical interface", Phyiscal Review A, vol. 91, No. 1, 2005, pp. 1-5.

\* cited by examiner

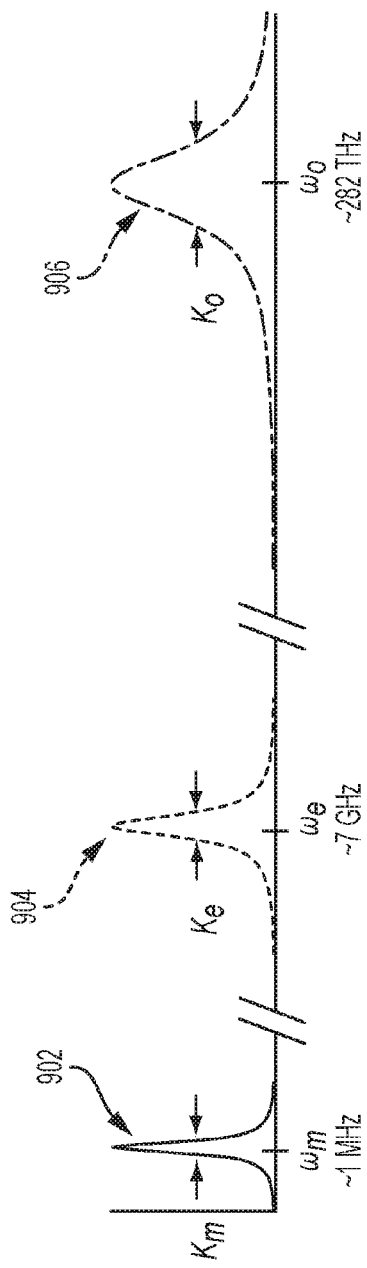
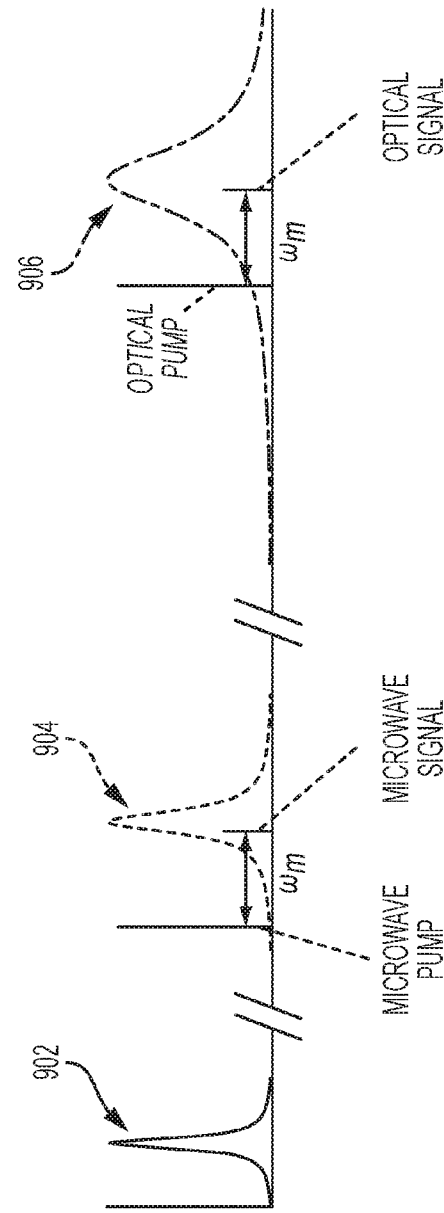
FIG. 9A
FIG. 9B

QUANTUM COHERENT MICROWAVE TO OPTICAL CONVERSION SCHEME EMPLOYING A MECHANICAL ELEMENT AND A SQUID

BACKGROUND

The present invention relates to frequency conversion, and more specifically, to frequency conversion between the microwave and optical domains.

A photon is an elementary particle, which includes the quantum of light and all other forms of electromagnetic radiation. A photon carries energy proportional to the radiation frequency and has zero rest mass.

Recently, scientific advances in the areas of quantum optics, microwave-frequency qubits and microelectromechanical (MEMS) resonators have attained or nearly attained the capacity to controllably prepare, manipulate and measure individual optical, microwave or mechanical quanta. Such systems demonstrate the high degree of perfection attained in engineering the superconducting microwave resonators, high-finesse optical cavities, high-quality-factor mechanical resonators and other elements needed for quantum operations. Systems that combine these advanced optical, microwave and/or mechanical elements offer new avenues for practical and useful technologies. In particular, a device which can convert quantum information between the microwave and optical realms will be an important technological advance and find a variety of uses in the areas of quantum computing and quantum information. For instance, while on the one hand superconducting microwave quantum bits may be easily fabricated in large numbers and high density, on the other hand optical systems show a superior ability to transmit quantum information long distances and to detect individual quanta. Also, for instance, a combination of two disparate technologies, such as the microwave-realm superconducting qubits and optical-realm trapped ions, may enable enhanced computing power.

SUMMARY

According to one embodiment, a frequency conversion apparatus is provided. The frequency conversion apparatus includes a mechanical resonator configured to oscillate at a mechanical resonance frequency with a displacement in an axis, and an optical resonator including a first mirror opposite a second mirror in which an optical cavity is formed between. The first mirror is fixed to the mechanical resonator such that the first mirror is moved to change an optical length of the optical cavity according to the displacement of the mechanical resonator, where changing the optical length changes an optical resonance frequency of the optical resonator. The frequency conversion apparatus includes a microwave resonator positioned to move according to the displacement of the mechanical resonator such that moving the mechanical resonator changes a Josephson inductance of the microwave resonator, thereby changing a microwave resonance frequency of the microwave resonator.

According to one embodiment, a method of configuring a frequency conversion apparatus is provided. The method includes configuring a mechanical resonator to oscillate at a mechanical resonance frequency with a displacement in an axis, and providing an optical resonator configured such that a motion of the mechanical resonator changes an optical length of the optical cavity according to the displacement of the mechanical resonator, where changing the optical length changes an optical resonance frequency of the optical resonator. The optical resonator includes a first mirror opposite a second mirror in which the optical cavity is formed between, and the first mirror is fixed to the mechanical resonator such that the motion of the first mirror changes the optical length. Further, the method includes configuring a microwave resonator positioned to move according to the displacement of the mechanical resonator such that moving the mechanical resonator changes a Josephson inductance of the microwave resonator, thereby changing a microwave resonance frequency of the microwave resonator.

According to one embodiment, a frequency conversion apparatus is provided. The frequency conversion apparatus includes a mechanical resonator configured to oscillate at a mechanical resonance frequency with a displacement in an axis, and an optical resonator configured such that the displacement of the mechanical resonator changes an optical length of the optical resonator. The optical resonator includes a first mirror opposite a second mirror in which an optical cavity is formed between. The first mirror is fixed to the mechanical resonator such that the first mirror is moved to change the optical length of the optical cavity, where changing the optical length changes an optical resonance frequency of the optical resonator. The frequency conversion apparatus includes a pickup coil positioned to move according to the displacement of the mechanical resonator such that moving the pickup coil changes a total magnetic flux received by the pickup coil. The pickup coil is in a circuit in which a current changes according to changes in the total magnetic field. Further, frequency conversion apparatus includes an input coil connected to the pickup coil via the circuit such that changing the total magnetic flux creates a secondary total magnetic field in the input coil, as a result of changing the current in the circuit. The frequency conversion apparatus includes a SQUID that is both coupled to the input coil and incorporated into a microwave resonator, such that changing the secondary total magnetic field changes a Josephson inductance of the SQUID, where changing the Josephson inductance changes a microwave resonance frequency of the microwave resonator.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

FIGS. 6A through 6E illustrate a process for assembling and fabricating the frequency conversion device according to an embodiment, in which:

FIG. 6A illustrates a wafer or chip as a substrate;

FIG. 6B illustrates forming a superconducting microwave resonator on top of the substrate;

FIG. 6C illustrates forming a mechanical resonator in proper alignment to the microwave resonator on the substrate;

FIG. 6D illustrates attaching a high-reflectivity mirror onto the mechanical resonator; and FIG. 6E illustrates forming an optical resonator by incorporation of a properly aligned fixed mirror.

FIG. 9A is a schematic of a frequency spectrum diagram according to an embodiment.

FIG. 9B is a schematic illustrating approximate frequency positioning of the pump tones and converted signals according to an embodiment.

DETAILED DESCRIPTION

Figure 1:
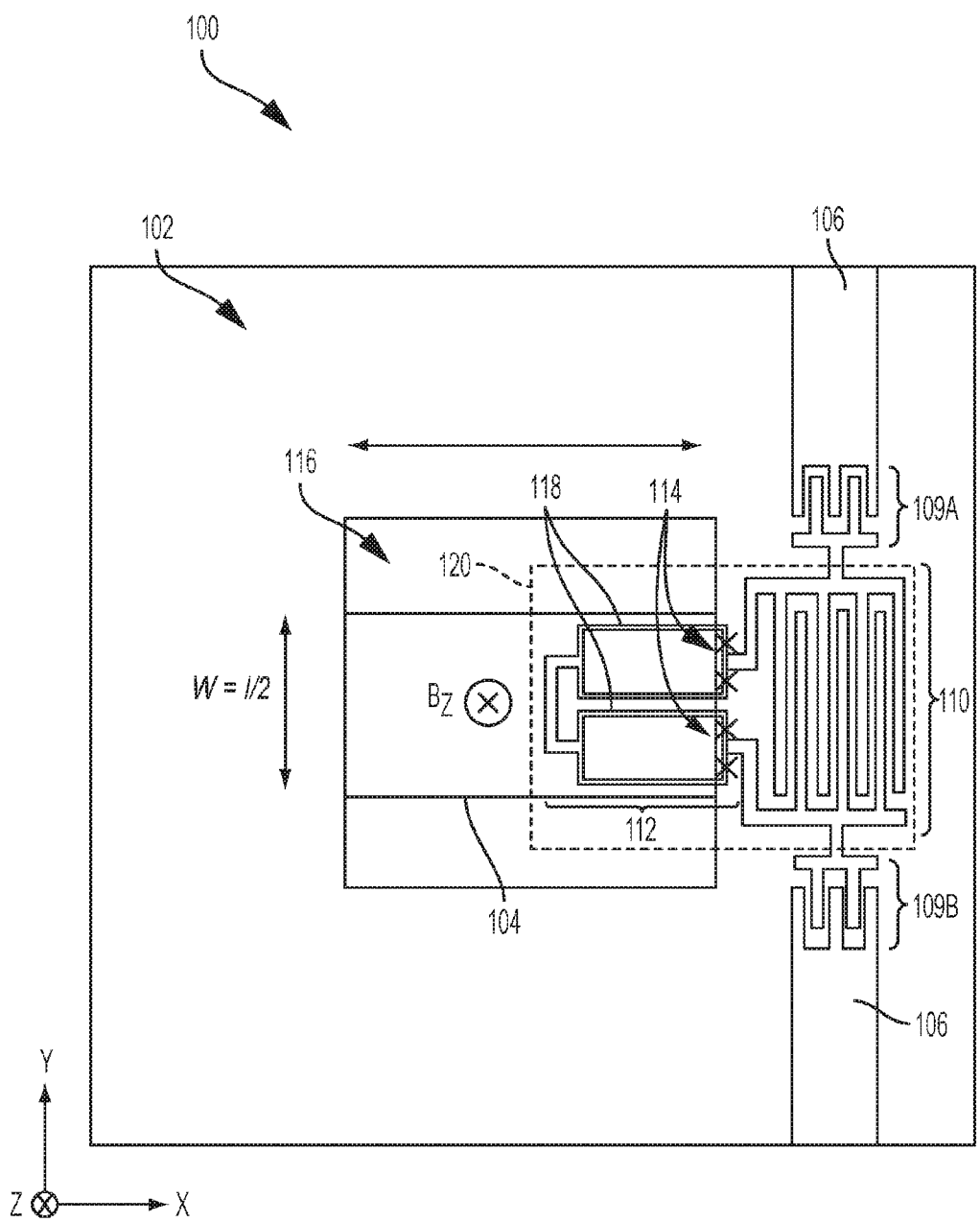
FIG. 1 is a schematic illustrating a top view of a frequency conversion device according to an embodiment.

A Josephson junction is a well-known type of superconducting electronic device comprising a non-superconducting barrier between two regions of superconducting metal, through which a superconducting current may pass without energy loss. The Josephson junction has well understood relations among the current, voltage, and phase of the current on either side of the junction, and the Josephson junction is characterized by a parameter known as a Josephson critical current. A Josephson junction exhibits an inductance, that is, a relation between its voltage and rate of change of current, which is known as the Josephson inductance. Adjustment of the Josephson critical current of a Josephson junction likewise adjusts the Josephson inductance. The relation of Josephson critical current and Josephson inductance within a Josephson junction is well understood by those skilled in the art. When the Josephson junction is incorporated into an electrical circuit, this property allows the Josephson junction to function as an inductor, e.g. it may be combined with a capacitor to form a resonant circuit. Combinations of multiple Josephson junctions within a circuit may likewise function as inductors and be incorporated into electrical circuits for this purpose.

A SQUID (Superconducting Quantum Interference Device) is a type of superconducting electronic device well known to those skilled in the art. In particular, the type of SQUID known as a DC (direct current) SQUID comprises a loop formed of superconducting wire, superconducting thin-film metal or other superconducting material, interrupted by two or more Josephson junctions. In this and the remainder of this document, the term SQUID will refer to this particular well-known type of SQUID containing two or more Josephson junctions in a current-carrying loop, i.e., the type known as a DC-SQUID. As is widely understood by those skilled in the art, via the principle of quantum interference of superconducting currents, the combined Josephson critical current of the Josephson junctions within the SQUID will vary depending on the magnetic flux experienced by the SQUID loop. Likewise, the Josephson inductance exhibited by the SQUID's Josephson junctions will also vary depending on such a magnetic flux. If the SQUID is embedded into an electrical circuit such as an electrical resonator, the behavior of the electrical circuit will likewise be adjusted by the magnetic flux experienced by the SQUID loop. Furthermore, arrays of SQUIDs may be arranged in an electrical circuit in such a way as to combine their inductances. It is specified that the magnetic flux of an in-plane loop represents a well-known and well-defined quantity comprising the magnetic field within the loop, multiplied by the cosine of the angle that the field makes with the axis perpendicular to the loop, integrated across the entire area of the loop. Thus, the SQUID is highly sensitive to both the magnitude and the direction of the magnetic field in its vicinity. For instance, if the field is parallel to the plane of the flat loop, the SQUID will experience zero flux. However, if a small tilt is imparted to this SQUID loop, the SQUID will experience a flux from the same field and thereby its Josephson inductance will be changed. To those skilled in the art, this sensitivity to magnetic field enables the SQUID to be employed as a useful component in an electric circuit, in that the variation of the SQUID's Josephson inductance causes useful changes in the circuit's properties. Because the dependence of the SQUID's critical current and Josephson inductance is highly nonlinear and is periodic with regard to flux, it is a common practice to those skilled in the art to apply a fixed magnetic 'bias' field perpendicular to the SQUID loop, in order to set the 'working point' of the SQUID. As understood by those skilled in the art, the Josephson inductance of a SQUID may also be modulated, i.e., changed rapidly and periodically, by the rapid periodic variation of the magnetic flux, as by rapidly and periodically changing the magnitude or direction of the magnetic field.

Embodiments provide a unitary frequency conversion scheme (using a frequency conversion device) between the microwave and optical domains which are suitable for quantum communication and quantum information processing. The capability to transduce quantum information back and forth between the optical and microwave domains has many intriguing and useful applications in quantum communication and quantum information processing. Via one or more frequency conversion devices in embodiments, the frequency conversion may be utilized for any application, and a few example applications are provided below.

1) The frequency conversion technique may be utilized to produce quantum entanglement between two superconducting quantum processors. Quantum entanglement is a method known to those practiced in the art, which links the quantum states of two quantum systems in a manner that is useful for exchanging information between them. The two superconducting quantum processors may reside inside two distant cryostats, and the cryostats may be connected by an optical fiber to communicate quantum information between them. In such a scheme, quantum information in the microwave domain is upconverted (via the frequency conversion device in embodiments) to an optical frequency in the transmitting cryostat, transferred with very small loss in the optical fiber connecting the two cryostats, and downconverted (via the frequency conversion device in embodiments) back to the microwave domain in the receiving cryostat. Alternatively, microwave quanta in each processor may be converted to optical photons that are each sent outwards from each cryostat through its optical channel, and the optical photons containing the quantum information from each of the two cryostats meet in a third location, where their meeting produces the entanglement. A cryostat is a device used to maintain low cryogenic temperatures of samples or devices (such as the frequency conversion device).

2) The frequency conversion technique is configured to allow quantum information carried by a microwave signal to be transmitted across long distances using optical fibers by upconverting the microwave frequencies to optical frequencies (via the frequency conversion device in embodiments).

3) The frequency conversion technique is configured to allow quantum communication between different forms of quantum processing units such as trapped ions and superconducting qubits.

4) The frequency conversion technique is configured to generate entangled photon pairs in the microwave domain and transfer the entangled photon to the optical domain or vice versa (via frequency conversion by the frequency conversion device in embodiments).

5) The frequency conversion technique is configured to use single photon detectors that are well-developed in the optical domain to detect single photons in the microwave domain.

A feature that any frequency conversion scheme seeks to satisfy in order to perform quantum information transduction is unitarity. Unitary means that the frequency conversion is to be lossless and coherent, i.e., the output signal should preserve the energy and the phase of the input signal. To date, there is no existing microwave-to-optical conversion device that fully satisfies this requirement. One or more frequency conversion devices in embodiments provide unitary frequency and/or near unitary frequency conversion, as understood by one skilled in the art.

Another feature of any frequency conversion scheme is conversion bandwidth, i.e., the rate at which the frequency conversion device can perform frequency conversion on propagating signals.

Figure 2:
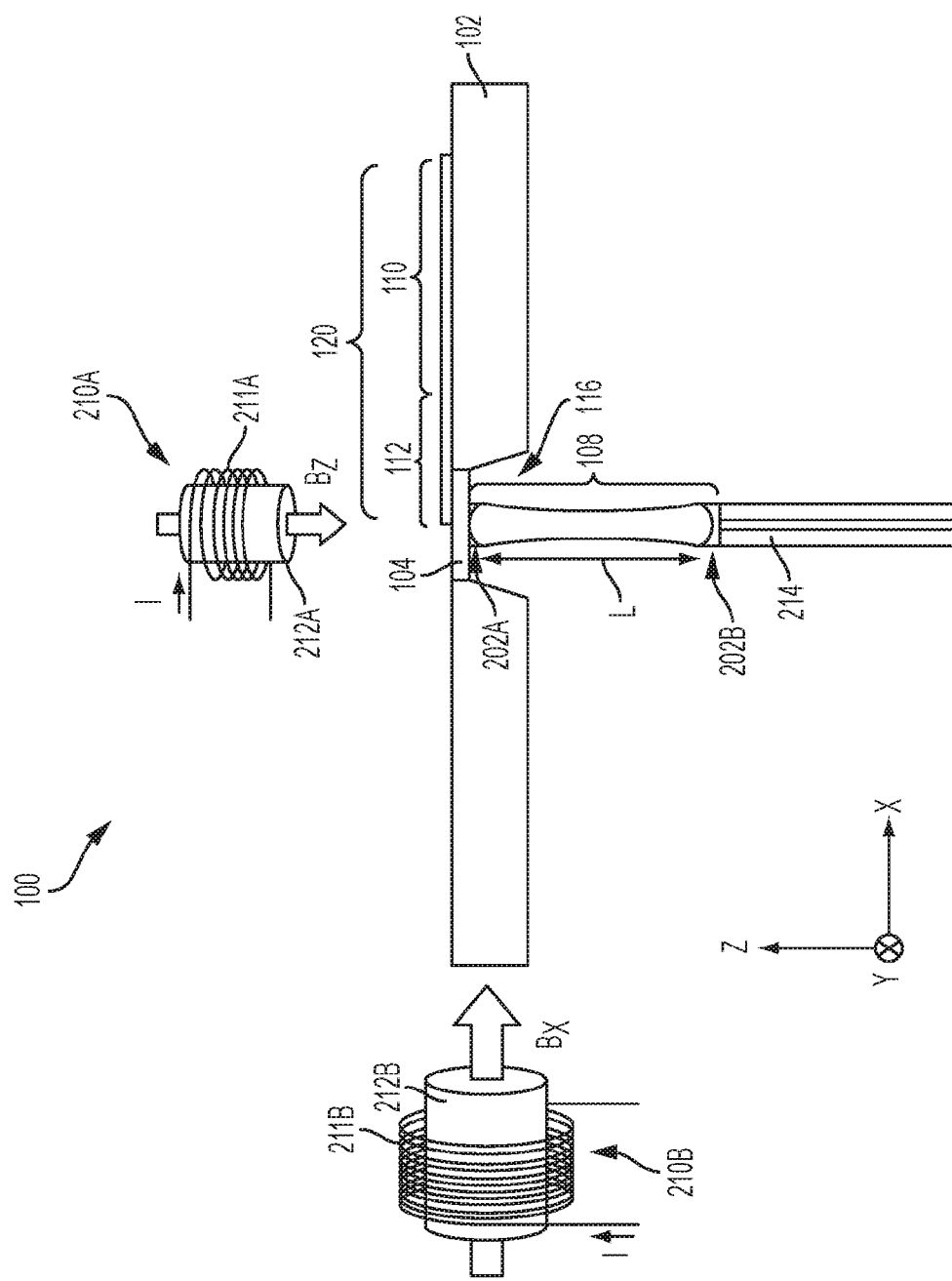
FIG. 2 is a schematic illustrating a side view of the frequency conversion device according an embodiment.

FIG. 1 is a schematic illustrating a top view of a frequency conversion device 100 according to an embodiment. FIG. 2 is a schematic illustrating a side view of the frequency conversion device 100 according an embodiment. The frequency conversion device 100 is configured to perform frequency conversion between the microwave domain and the optical domain by coupling a superconducting microwave resonator 120 to an optical resonator 108 (i.e., an optical cavity) via a mechanical resonator 104.

According to an embodiment, the frequency conversion device 100 includes a substrate 102, e.g., a dielectric substrate (such as a wafer, chip, etc.), onto which the mechanical resonator 104 is fixed. The attachment and arrangement of the mechanical resonator 104 on the substrate 102 may include an opening 116 through the center of the substrate 102, so as to expose both the top and bottom sides of the mechanical resonator 104. The opening 116 in the substrate 102 may be a geometric shape, such as a square, rectangle, hexagon, etc. The mechanical resonator 104 can oscillate (move back and forth) while attached to the substrate 102. As illustrated in the embodiment shown in FIG. 2, the direction of motion is specified to be in the z direction. In one implementation, the mechanical resonator 104 may be a clamped-clamped cantilever, in which both ends of the cantilever are attached to the substrate 102. According to this embodiment, the length of the cantilever as the mechanical resonator 104 is l while the width w of the cantilever as the mechanical resonator 104 may be about half the length l. The substrate 102 may have an opening 116. The opening 116 is designed to expose both top and bottom sides of the cantilever. The opening should be no greater in dimension than length l, such that ends of the cantilever are able to attach (e.g., i.e., be clamped) to the substrate 102 in the opening 116.

Other embodiments of the frequency conversion device may include a mechanical resonant element which is not a clamped-clamped cantilever but is instead a vibrating membrane, a singly-clamped cantilever, a vibrating ring, vibrating disc, vibrating sphere, or another type of high-frequency mechanical resonator whose frequency and direction of vibration are in accordance with that embodiment. In such embodiments, the mechanical resonator is likewise attached to a substrate and coupled to a SQUID, a microwave resonator and an optical resonator in such a manner that the motion of the mechanical resonator simultaneously modulates the frequency of the optical resonator by changing its length as well as modulates the frequency of the microwave resonator by changing the Josephson inductance of the SQUID.

The superconducting microwave resonator 120 comprises a capacitor, as for instance a lumped-element capacitor with interdigitated fingers 110, which is shunted by an inductance comprising the Josephson inductance of a SQUID or an array of multiple SQUIDs 112 connected together. In one implementation, the SQUID array 112 may include two Josephson junctions 114 connected in parallel in a superconducting loop 118, and two more Josephson junctions 114 connected in parallel in another superconducting loop 118. The loops 118 are connected together at one end, and the other end of the loops 118 is connected to separate sides of the capacitor 110. When the magnetic flux through the SQUID array 112 is modulated (increased and decreased in a periodic manner), the Josephson inductance of the SQUID array 112 is likewise modulated and therefore the resonance frequency of the microwave resonator 120 is likewise modulated. An increase in the Josephson inductance decreases the microwave resonance frequency while a decrease in the Josephson inductance increases the microwave resonance frequency, and such modulation occurs repeatedly in a periodic fashion as the mechanical resonator 104 vibrates up and down in the z direction. The action of the mechanical resonator 104, in vibrating up and down in the z direction, serves to modulate the magnetic flux experienced by the SQUID 112 in the presence of a magnetic field. This modulation occurs with a periodicity given by the periodicity (the resonance frequency) of the mechanical resonator 104, and this modulation likewise serves to modulate the resonance frequency of the microwave resonator 120, with the same periodicity.

For a SQUID loop or pickup coil lying in the x-y plane and for a mechanical component that vibrates in the z direction, there must be present at the position of the mechanical component a fixed magnetic field (B field) having a component in the x direction ($B_x$) and a component in the z direction ($B_z$). The B field in the x direction and z direction may be generated by a solenoid, a fixed magnet, or any other means. In one implementation, a first magnetic device 210A may generate the $B_z$ component of the magnetic field, and a second magnetic device 210B may generate the $B_x$ component of the magnetic field.

The SQUID array 112 is positioned on part of the mechanical resonator 104 so as to enable the mechanical motion in the z direction to modulate the flux through the SQUID 112. Particularly, the SQUID array 112 is positioned on about half of the clamped-clamped cantilever of the mechanical resonator 104. In one embodiment, two microwave resonators 102, such as microwave resonators 120_1 and 120_2 discussed further in FIG. 4, may share the cantilever. In another embodiment, a pickup coil as shown in FIG. 5, is positioned on the cantilever, and the modulated flux experienced by the pickup coil serves to modulate the flux through a SQUID 118 positioned at a different location on the substrate 102.

According to an embodiment, the optical resonator 108 comprises two high reflectivity mirrors 202A and 202B with very small internal loss. An example of high reflectivity mirrors may be mirrors having a reflectivity above 99%. By having the two mirrors 202A and 202B of the optical resonator 108, an optical cavity is formed with length L. The optical resonator 108, which is the same as the optical cavity, is an arrangement of mirrors 202A and 202B that form standing waves for light waves.

One of the mirrors is fixed, e.g., mirror 202B, while the other mirror 202A is moveable and positioned onto the cantilever 104. In this embodiment, the mirror 202A is positioned at the center of the cantilever, and the mirror 202A and the SQUID array 112 are arranged on opposite sides of the cantilever 104. The cantilever 104 may be a metal or a dielectric material which is fixed (clamped) to the substrate 102 and on which the mirror 202A and SQUID array 112 are fixed (e.g., glued with an adhesion material).

Vertical displacements of the mechanical resonator 104 (i.e., the cantilever) back and forth in the z-direction shift the resonance frequency of the optical resonator 108 (i.e., change the length L of the optical cavity). By further applying the fixed vertical and horizontal magnetic fields $B_x$ and $B_z$ to the superconducting loops 118 of the SQUID array 112, the motion of the mechanical resonator 104 (i.e., cantilever) in the vertical direction (i.e., z-axis) varies the total magnetic flux (i.e., the total vector product of magnetic field with loop area) experienced by the SQUID array 112. Because the combined inductance of the included Josephson junctions 114 depends on this magnetic flux, the motion of the mechanical resonator 104 thereby modulates the resonance frequency of the microwave resonator 120 of which the Josephson junctions 114 form the primary inductive part.

The vertical displacement of the mechanical resonator 104 is configured to (simultaneously) change the microwave resonance frequency of the microwave resonator 120 and the optical resonance frequency of the optical resonator 108.

In FIGS. 1 and 2, one side of the capacitor 110 of the microwave resonator 120 is connected to a coupling capacitor 109A and the other side of the capacitor 110 is connected to a coupling capacitor 109B. Both coupling capacitors 109A and 109B are connected to feedline 106. The feedline 106 serves as both the input and output for the microwave resonator 120. Both the microwave pump signal (also referred to as the microwave pump tone) and the microwave signal/photon carrying quantum information are transmitted down the feedline 106 to the microwave resonator 120. The microwave resonator 120 (including the SQUID arrays 112 (having loops 118 and Josephson junctions 114) and capacitor 110), the coupling capacitors 109A, 109B, and the feedline 106 are made of superconducting material, such as, e.g., niobium, aluminum, etc., and are cooled to superconducting temperatures. Although the capacitor 110 is drawn as an interdigitated capacitance in FIG. 1, it should be appreciated that the capacitor 110 may be a gap capacitor or a plate capacitor.

The mirror 202B is the port for the optical resonator 108 and may be optically connected to one or more light sources for receiving light, such as both receiving the optical signal and the optical pump signal. In one implementation, the mirror 202B of the optical resonator 108 may be connected to an optical fiber 214. The optical fiber 214 may serve as both the input (for inputting light) and the output (for extracting light) for the mirror 202B (i.e., input/output port) of the optical resonator 108. The mirror 202B may be part of the optical fiber 214 or may be separate from the optical fiber 214.

Other embodiments of the frequency-conversion device 100 may include an optical resonator (optical cavity) which does not comprise two opposing high-reflectivity mirrors with a vacuum space between them. For example, instead the optical resonator (optical cavity) may comprise a region of solid material that guides the light to reflect between two mirrors, or a region of solid material that guides the light to reflect within itself, as for instance in a fiber-optic resonator or an optical ring resonator which operates on the principle of total internal reflection. Such modifications would be understood by those skilled in the art, given the teachings disclosed herein. In such embodiments, the mechanical resonator, the optical resonator and the microwave resonator are to be configured so that the motion of the mechanical resonator modulates the length of the optical cavity, thereby modulating its optical resonance frequency, and simultaneously the motion of the mechanical resonator modulates the magnetic flux through a SQUID so as to modulate the resonance frequency of the microwave resonator. Such embodiments may include a mirror attached to the mechanical resonator, may include a piece of light-guiding material attached to the mechanical resonator, or may incorporate the optical cavity within the mechanical resonator in some other way.

Figure 3:
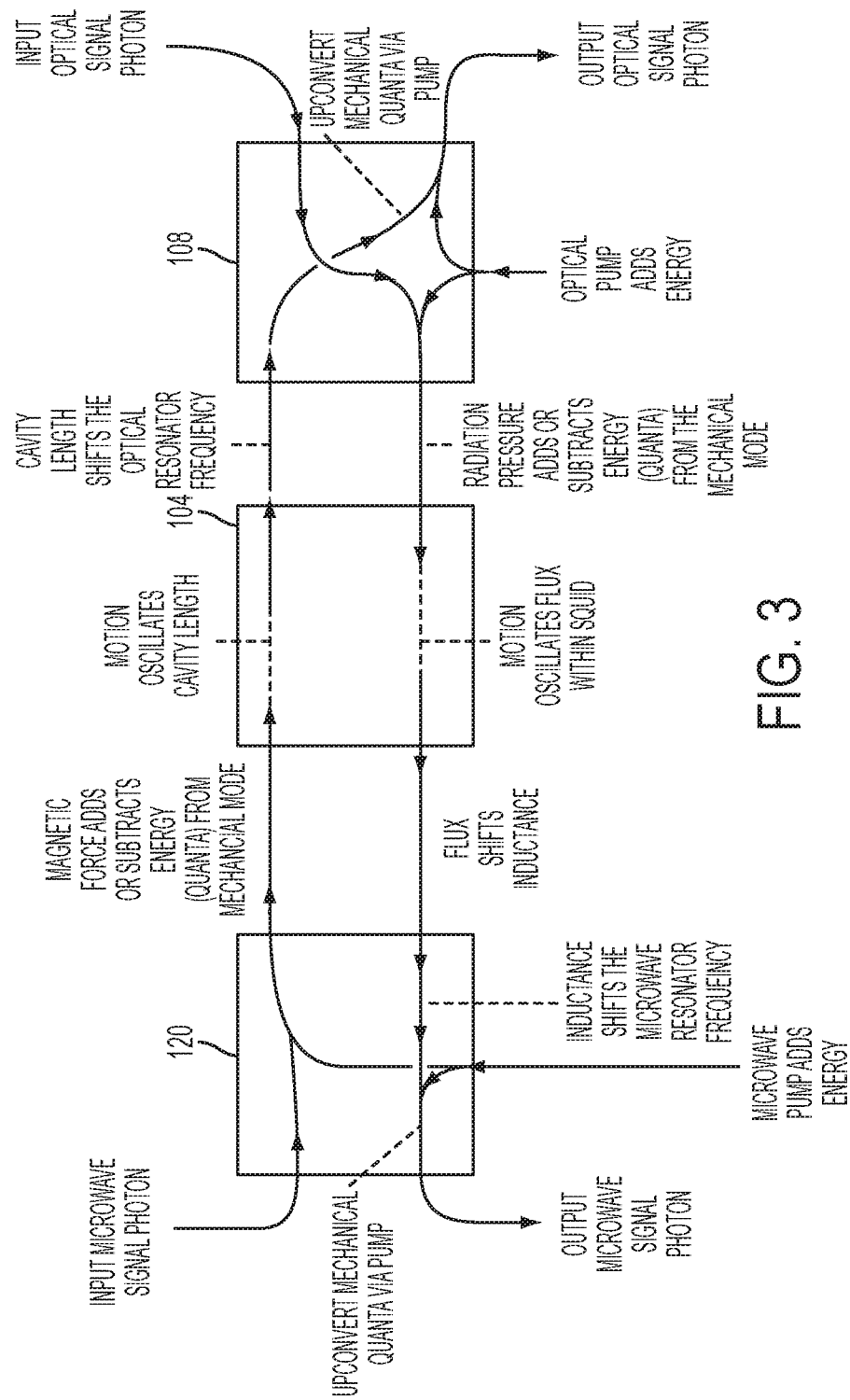
FIG. 3 is a diagram illustrating operation of the frequency conversion device according to an embodiment.

FIG. 3 is a block diagram illustrating an operation for the frequency conversion device 100 according to an embodiment. The frequency conversion device 100 is designed to covert an input microwave signal photon (e.g., transmitted on the feedline 106) into an output optical signal photon (that is output through the mirror 202B of the optical resonator 108), and vice versa, to convert an input optical signal photon (transmitted through the mirror 202B) into an output microwave signal photon (that is output from the microwave resonator 120 on the feedline 106). The first scenario discusses operating the frequency conversion device 100 to convert the input microwave signal photon into an output optical signal photon. Reference can be made to FIGS. 1 and 2.

In the first scenario illustrating frequency upconversion by the frequency conversion device 100, a microwave signal photon is input into the feedline 106 to the microwave resonator 120 via coupling capacitors 109A, 109B, and the microwave signal photon is the microwave signal (containing quantum information) to be converted into an optical signal. Concurrently, a microwave pump applied on the feedline 106 to the microwave resonator 120, adds energy to the microwave resonator 120. Because the oscillation of the mechanical resonator 104 shifts the microwave resonance, the mechanical resonator 104 functions as a frequency-modulation device, and thus facilitates frequency-mixing between the information-containing microwave photon signal and the microwave pump. As a result, the information-containing microwave photons are frequency-converted in a coherent fashion into mechanical quanta in the motion of the mechanical resonator 104. The rate of this conversion is enhanced by increasing the pump power of the microwave pump. To further maximize this effect, the microwave pump signal is applied with a (microwave) frequency that is off resonance with the microwave resonance frequency of the microwave resonator 120.

The microwave signal at resonance and the microwave pump tone can add or subtract energy from the mechanical mode, i.e., may increase or decrease the amplitude of the vibrational motion of the mechanical resonator 104, by the modulation of the energy contained in the microwave mode. As the mechanical resonator 104 oscillates, the resonance frequency of the microwave resonator 120 likewise oscillates, and therefore the microwave resonator cyclically admits a greater or lesser amount of energy from the fixed-frequency microwave pump tone. This periodic change in energy within the microwave resonator 120 is therefore a function of the position of the mechanical resonator 104 within its oscillation cycle, and a change of energy as a function of position constitutes a force. Depending on the phase and frequency of the pump tone and on the phase of the mechanical motion, the force may lag the motion, thus acting as a drag force and subtracting energy from the mechanical motion, or else may lead the motion, thus acting like a driving force and adding energy to the mechanical motion.

The mechanical resonator 104 oscillates, and the motion of the mechanical resonator 104 oscillates the length L of the optical cavity by oscillating the position of the mirror 202A. Change in optical cavity length shifts the optical resonance frequency of the optical resonator 108. A shorter length for the optical cavity (formed by mirrors 202A and 202B) causes a higher optical resonance frequency while a longer length for the optical cavity causes a lower optical resonance frequency in the optical resonator 108. Therefore, the optical resonance frequency is periodically modulated at the mechanical resonance frequency. The optical resonator 108 receives the optical pump signal via mirror 202B. The optical pump signal is applied at a frequency that is lower than the optical resonance frequency by an amount roughly equaling the mechanical resonance frequency. The periodic modulation of the optical resonance frequency by the mechanical motion therefore, by the action of frequency mixing, converts a portion of the optical pump energy into optical photon energy at the optical resonance frequency, in a manner that coherently preserves the phase of the mechanical motion.

In the first scenario illustrating frequency upconversion by the frequency conversion device 100, the process involves first the absorption of a microwave signal photon from the microwave resonator 120 and generation of a mechanical quantum in the mechanical resonator 104; the generation of the mechanical quantum in the mechanical resonator 104 preserves the phase of the microwave photon. The process secondly involves the absorption of this mechanical energy quantum and production of an optical photon, and the optical photon preserves the phase of the mechanical quantum. Thereby, the phase introduced to the mechanical motion via conversion from the microwave photon signal (e.g., at approximately 7 GHz in one example) is subsequently upconverted to the optical regime (e.g., at approximately 282 terahertz (THz) in one example). The output optical signal photon having been frequency upconverted, exits the device 100 through the mirror 202B (as the mirror 202B operates as input port and output port) and travels down the optical fiber 214; as such, the output optical signal photon carries the quantum information which previously entered the device via the input microwave signal photon that had a frequency of, e.g., 7 GHz.

In the second scenario illustrating frequency downconversion by the frequency conversion device 100, an optical signal photon (e.g., at about 282 THz) is input from the optical fiber 214 into the optical resonator 108 via the mirror 202B. The optical signal photon is the optical signal (containing quantum information) to be converted into a microwave signal at the microwave frequency. Concurrently, an optical pump pumps an optical pump signal to the mirror 202B (e.g., from the optical fiber 214) of the optical resonator 108, and the optical pump signal adds energy to the optical resonator 108 and the mechanical resonator 104. As noted above, the microwave pump signal and an optical pump signal are both applied to the frequency conversion device 100 in order to enhance and control the operation. The optical pump signal is applied with a frequency that is off resonance with the optical resonance frequency of the optical resonator 108. The input optical signal photon having the quantum information and the optical pump signal combine to produce energy at the mechanical resonance mode of the mechanical resonator 104, and this energy causes (or contributes) to the oscillation of the mechanical resonator 104.

The interaction of the mechanical motion with the optical resonator 108 may be understood using the concept of radiation pressure. Photons (optical quanta) traveling within the optical cavity (i.e., the optical resonator 108) exert a force on the mirror 202A (i.e., a pressure applied to the surface of the mirror 202A) as the optical photons continuously strike the mirror 202A. To add or subtract energy from the mechanical mode (to increase or decrease the amplitude of the vibration of the mechanical oscillator 104), this force is to be varied at the frequency of the mechanical motion and with a phase that either leads or lags the motion of the mechanical oscillator. The oscillation of the mechanical resonator 104 (e.g., the cantilever) periodically modulates the optical resonance frequency of the optical cavity (i.e., the optical resonator 108) and this frequency modulation enables frequency mixing, i.e., upconversion and downconversion of frequencies, between the optical resonator frequency and the mechanical resonator frequency. The periodic modulation of the optical resonator frequency means the pump energy admitted to the optical cavity (i.e., optical resonator 108) is likewise periodically modulated at the frequency of the mechanical oscillator 104. The corresponding periodic variation of the radiation pressure force applied to the mechanical resonator 104 enables this radiation pressure force to add or subtract energy to the mechanical mode, i.e., to increase or decrease the amplitude of the vibrational motion of the mechanical resonator 104. In combination with the frequency-mixing action this behavior adds or subtracts energy quanta to/from the mechanical resonator mode, i.e. to/from the vibration of the mechanical resonator 104.

The mechanical resonator 104 oscillates in the vertical, i.e., z direction, and thereby the amount of magnetic flux within the SQUID loops of the SQUID array 112, due to the magnetic fields Bx and Bz, is varied periodically at the mechanical resonator frequency. As the mechanical resonator 104 flexes upwards and downwards, the angle of orientation of the SQUID loops in the SQUID array 112 in the microwave resonator 120 varies relative to the direction of the magnetic field B. The axis of the SQUID loop 108 is nearly perpendicular to the $B_z$ component of the magnetic field, and therefore changes in the angle negligibly affect the amount of magnetic flux due to $B_z$ field. However, small flexures deviate the SQUID loop from being parallel to $B_x$ and therefore the primary effect of oscillation is to vary the amount of flux due to the $B_x$ magnetic field component. In implementing and configuring the frequency conversion device 100 the user may therefore set $B_z$ in order to specify the 'working point' of the SQUID 118, whereas the user may set $B_x$ to specify the magnitude of the modulation effect of the SQUID 118. A change in the total magnetic flux in the SQUID array 112 (based on a change in orientation of the SQUID array 112) shifts the Josephson inductance of the SQUID array 112. A change in this inductance correspondingly shifts the microwave resonance frequency of the microwave resonator 120. A smaller Josephson inductance causes a higher microwave resonance frequency, and a larger inductance causes a lower microwave resonance frequency. The microwave resonator 120 receives the microwave pump signal at a microwave frequency which differs from the microwave resonance frequency by an amount roughly equal to the mechanical resonance frequency. The oscillation of the orientation of the SQUID array 112 caused by the oscillation of the mechanical resonator 104 thereby oscillates the microwave resonance frequency so that a greater or lesser amount of energy from the microwave pump signal is admitted to the microwave resonator 120, the rate of this oscillation equaling the mechanical resonator frequency. The frequency modulation of the microwave resonator 120 thus enables the microwave resonator 120 to upconvert the mechanical motion quanta to produce a microwave signal photon (e.g., at approximately 7 GHz) while retaining the phase of the mechanical quantum.

In the second scenario illustrating frequency downconversion by the frequency conversion device 100, the process involves first the absorption of an optical signal photon from the optical resonator 108 and generation of a mechanical quantum in the mechanical resonator 104. The generation of the mechanical quantum in the mechanical resonator 104 preserves the phase of the optical photon. The process secondly involves the absorption of this mechanical energy quantum and production of a microwave photon that preserves the phase of the mechanical quantum. Thereby, the downconversion from optical to microwave frequency preserves the phase of the signal from the optical to the microwave regime. The feedline 106 operates as an input and output port, and the output microwave signal photon, having been frequency downconverted from the original optical signal, travels outwards on the feedline 106.

The magnetic fields $B_z$ and $B_x$ may be generated by any magnetic field generating device 210A and 210B. As a non-limiting example, the magnetic field generating devices 210A and 210B may have coils 211A, 211B around a metal material 212A, 212B. It is appreciated that other types of magnetic field generating devices may be utilized.

In one implementation, the microwave resonator 120 may be configured to have a microwave resonance frequency of 7 GHz, and the microwave resonator 120 may have a change in its microwave resonance frequency per nanometer vertical displacement (of the cantilever) of 200 MHz per nanometer. As such, when the mechanical resonator 104 flexes 1 nm the microwave resonance frequency of the microwave resonator 120 increases or decreases, respectively, by 200 MHz (as a result of the corresponding change in Josephson inductance). The optical resonator 108 may be configured to have an optical resonance frequency of 282 THz, and the optical resonator may have a change in its optical resonance frequency per nanometer vertical displacement (of the cantilever) of 10 MHz per nanometer. As such, when the mechanical resonator 104 flexes 1 nm the optical resonance frequency of the optical resonator 108 increases or decreases, respectively, by 10 MHz (as a result of the corresponding change in optical length L). Accordingly, when a microwave signal at a 7 GHz frequency is to be upconverted by the frequency conversion device 100, the frequency conversion device 100 upconverts the microwave signal at the 7 GHz frequency to an optical signal at a 282 MHz frequency, such that the optical signal having been upconverted can be sent outwards on the optical fiber 214. Likewise, when an optical signal at a 282 THz frequency is to be downconverted by the frequency conversion device 100, the frequency conversion device 100 downconverts the optical signal at the 282 THz frequency to a microwave signal at a 7 GHz, such that the microwave signal having been downconverted can be sent outwards the feedline 106.

Figure 4:
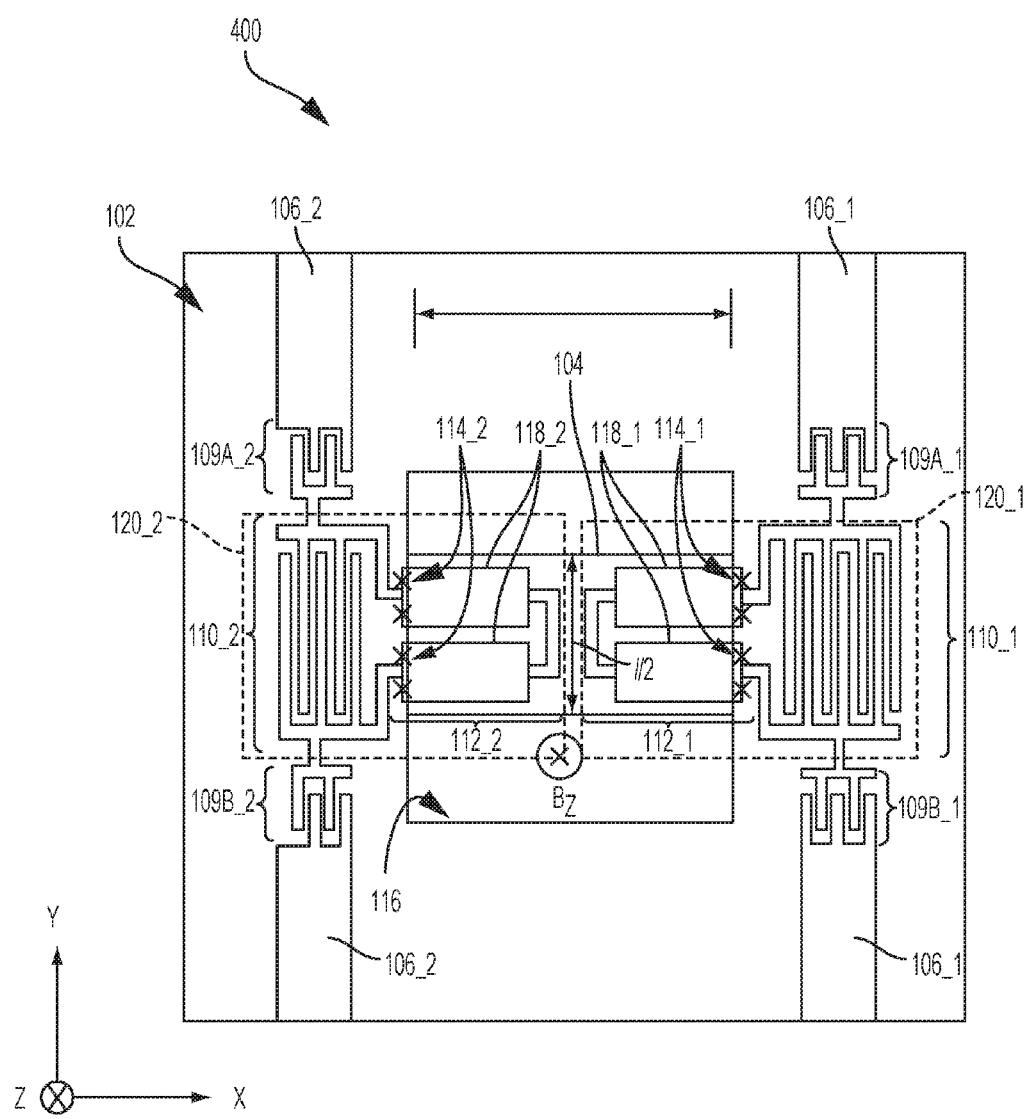
FIG. 4 is a schematic illustrating a top view of a frequency conversion device according to another embodiment.
Figure 5:
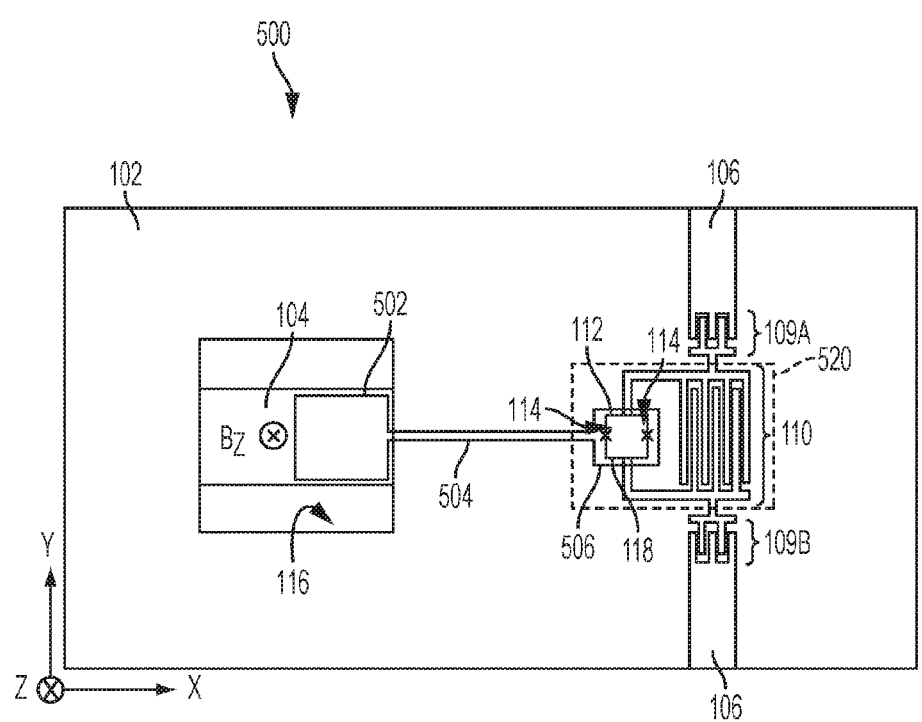
FIG. 5 is a schematic illustrating a top view of a frequency conversion device according to yet another embodiment.

Now turning to FIG. 4, a schematic is provided illustrating a top view of a frequency conversion device 400 according to another embodiment. The frequency conversion device 400 includes all the elements of the frequency conversion device 100 in FIGS. 1 and 2, except that a second microwave resonator is coupled to the optical cavity by utilizing the other half of the cantilever. Also, some elements of the frequency conversion device 100 in FIG. 2 are not repeated in the frequency conversion device 400 although these elements (such as, e.g., the elements 108, 202A, 202B, 210A, 210B, 214) are meant to be included and/or utilized in the device 400.

As discussed above, the frequency conversion device 400 includes the substrate 102 supporting the mechanical resonator 104. The substrate 102 may contain an opening 116. The opening 116 enables both the top and bottom surfaces of the mechanical resonator to be exposed and/or accessed.

Referring to FIG. 4, a first and second microwave resonator 120_1 and 120_2 are coupled to the optical resonator 108 (i.e., optical cavity) via the mechanical resonator 104. As discussed above, the superconducting microwave resonators 120_1 and 120_2 respectively comprise the lumped-element capacitor 110_1, 110_2 shunted by the SQUID array 112_1, 112_2. Each SQUID in arrays 112_1, 112_2 respectively includes Josephson junctions 114_1, 114_2 connected in parallel in SQUID loops 118_1, 118_2, forming SQUID arrays 112_1, 112_2. The two ends of each SQUID array 112_1, 112_2 respectively connect to separate sides of capacitors 110_1, 110_2. Each SQUID array 112_1, 112_2 thus comprises a flux-tunable inductance. The Josephson inductance of each SQUID array 112_1, 112_2 is varied periodically as the mechanical resonator 104 flexes up and down, thereby shifting the magnetic flux within the two SQUID loops resulting from the horizontal and vertical magnetic fields $B_x$ and $B_z$.

Unlike the frequency conversion device 100, the frequency conversion device 400 has the SQUID array 112_1 positioned on part (about half) of the mechanical resonator 104, while the SQUID array 112_2 is positioned on the other part (the half). As discussed above, the motion of the mechanical oscillator 104, while periodically varying the Josephson inductances of SQUID arrays 112_1 and 112_2, also simultaneously varies the length (and therefore the optical resonance frequency) of an optical resonator 108. This regular periodic variation may occur by, for instance mirror 202A being attached to the mechanical resonator, and thereby oscillating its position (mirror 202A) relative to that of mirror 202B. The mirror 202A may be positioned at the center of the surface of the cantilever 104, on the opposite side from that where the SQUID 112_1, 112_2 are located.

Vertical displacements of the mechanical resonator 104 (i.e., the cantilever) shift the length of the optical cavity and therefore shift the resonance frequency of the optical resonator 108. By further applying fixed vertical field and fixed horizontal magnetic field (via for instance the magnetic device 210A and 210B) in the region of the mechanical resonator, an inductive coupling is introduced between the microwave resonator 120_1, 120_2 and the mechanical resonator 104. The periodic oscillating flexure of the cantilever 104 (i.e., mechanical resonator) up and down in the vertical direction (i.e., z-axes) periodically varies the total magnetic flux threading the SQUID arrays 112_1, 112_2; this oscillating changes the total magnetic flux threading the SQUIDs 112_1, 112_2 correspondingly changing the Josephson inductance of the SQUIDs and therefore changes the microwave resonance frequency of the respective microwave resonators 120_1, 120_2.

One side of the capacitor 110_1, 110_2 of the respective microwave resonator 120_1, 120_2 is connected to the respective coupling capacitor 109A_1, 109A_2 and the other side of the capacitor 110_1, 110_2 is connected to the respective coupling capacitor 109B_1, 109B_2. Both coupling capacitors 109A_1, 109A_2 and 109B_1, 109B_2 are respectively connected to feedline 106_1, 106_2.

The first microwave resonator 120_1 and the second microwave resonator 120_2 each may have a different microwave resonance frequency. An off-resonance microwave drive tone via feedline 106_1 or 106_2 selects which microwave resonator 120_1 or 120_2 is coupled to the optical resonator 108 (optical cavity), depending on which microwave resonator 120_1 or 120_2 this microwave off-resonance drive (i.e., microwave pump signal) is applied to.

FIG. 5 is a schematic illustrating a top view of a frequency conversion device 500 according to yet another embodiment. The frequency conversion device 500 includes the elements of the frequency conversion device 100 in FIGS. 1 and 2, although some elements are not repeated.

The frequency conversion device 500 includes a microwave resonator 520. The microwave resonator 520 has a SQUID 112 shunted by the capacitor 110. In this implementation, only a single loop 118 is utilized with two Josephson junctions 114. In another implementation, two or more loops 118 may be utilized to form an array of SQUIDs 112. As discussed above, the respective sides of the capacitor 110 are connected to coupling capacitors 109A and 109B, and the coupling capacitors 109A and 109B are connected to the feedline 106.

Unlike the frequency conversion device 100, the frequency conversion device 500 positions the entire microwave resonator 520 on the substrate 102 with no elements on the mechanical resonator 104. In this case, the SQUID 112 of the microwave resonator 520 does not move with the movement of the mechanical resonator 104 (i.e., cantilever). Instead, a superconducting pickup coil 502 is fixed on top of the mechanical resonator 104 (i.e., cantilever) along with the mirror 202A, such that both the superconducting pickup coil 502 and the mirror 202A oscillate with the mechanical resonator 104. The mirror 202A and the pickup coil 502 may be positioned on opposite surfaces of the mechanical resonator 104.

The mechanical motion (of the mechanical resonator 104) is made to modulate the SQUID's Josephson inductance (in the SQUID 112) via the superconducting pickup coil 502, a superconducting connecting line 504, and a superconducting input coil 506. In this way, the microwave resonator 120 and SQUID 112 may be positioned at a distance from the mechanical resonator 104 to avoid interference to the SQUID 112 by the optical and magnetic fields present in the vicinity of the mechanical resonator 104. The orientation of the superconducting pickup coil 502 varies as mechanical resonator 104 flexes up and down. The variation in magnetic flux admitted to the pickup coil 502 correspondingly varies the current in the circuit (via line 504) with the input coil 506. The input coil 506 is connected to the pickup coil 502 via the circuit such that changing the magnetic flux in the pickup coil 502 creates a secondary total magnetic field in the input coil 506. The SQUID 112 is coupled to the input coil 506 by mutual inductance such that changing the secondary total magnetic field changes the Josephson inductance of the SQUID 112. This method of adjusting the Josephson critical current or Josephson inductance of a SQUID by using a pickup coil at a location distant to the SQUID is well known to those skilled in the art. The oscillating variation in magnetic flux through the pickup coil 502 thereby causes the microwave resonance frequency of the microwave resonator 520 to oscillate. As discussed above, changing (increasing and decreasing) the inductance in the microwave resonator 520 changes the microwave resonance frequency of the microwave resonator 520.

In one implementation, the SQUID 112 may incorporate a single-turn SQUID washer coil and overlaid multi-turn input coil as understood by one skilled in the art.

FIGS. 6A through 6E illustrate side views of a process for assembling and fabricating the frequency conversion device 100 according to an embodiment.

Figure 6A:

FIG. 6A illustrates a wafer or chip of dielectric substrate 102. The substrate 102 may be silicon, sapphire, silica, and/or other material and may have thickness of approximately 100 microns (μm) to 3 millimeters (mm).

Figure 6B:
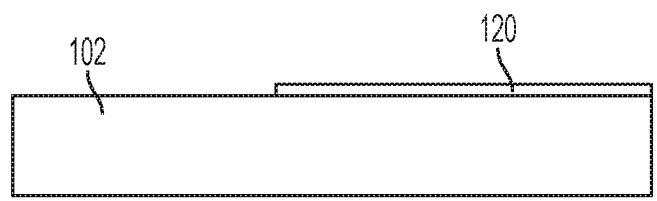

FIG. 6B illustrates forming the superconducting microwave resonator 120 and SQUID 112 as a thin-film metal pattern on top of the substrate 102. The metal may be approximately 50 nm to 2 microns thick and may be formed of aluminum, niobium, or other superconducting metal. The superconducting metal (forming the superconducting microwave resonator 120 and SQUID 112, along with capacitors 109A, 109B, 110 and feedline 106) may be deposited on top of the substrate 102 by evaporation, sputter, or other conventional metal-deposition methods. The pattern may be formed in the metal using photolithography, e-beam lithography, or other patterning techniques. Also, the pattern may be formed in the metal using wet chemical etch, plasma etch, lift-off, or other metal-film patterning methods. The metal film may be single-layer or multi-layer. The Josephson tunnel junctions 114 in the SQUID 112 may be formed using an AlOx tunnel barrier or other tunnel barrier. The Josephson tunnel junctions 114 may be formed using conventional methods such as a Nb/AlOx/Nb trilayer method, an Al double-angle-evaporation method, or some other method. The capacitors 109A, 109B and 110 may be formed as interdigitated capacitors made of a single metal layer, or may be parallel-plate capacitors formed by multiple layers of metal and dielectric, or some other design.

Figure 6C:
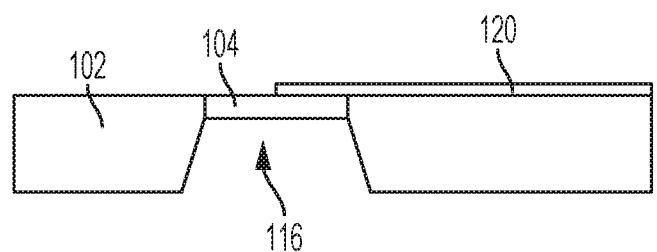

FIG. 6C illustrates forming the resonant mechanical (MEMS) element (which is the mechanical resonator 104) in proper alignment to the microwave circuit (i.e., the microwave resonator 120) on the substrate 102, and leaving an open space 116 on the opposite side for incorporation of the attached mirror and optical cavity. The mechanical resonator 104 (particularly the cantilever) may be formed from silicon, silicon nitride, silicon carbide, and/or any other dielectric material that has high stiffness and low mechanical dissipation at cryogenic temperatures. The dielectric material may be incorporated into the substrate 102 by using silicon-on-insulator (SOI) technology or may be applied to the substrate as a thin film of, e.g., 0.5 to 10 micron thickness, using vapor deposition or other methods. The patterning of the mechanical resonator 104 may employ such techniques as photolithography or e-beam lithography, and the formation of the free-suspended mechanical resonator 104 (MEMS element, e.g., cantilever) may use plasma etch, wet chemical etch, $XeF_2$ etch, critical-point drying or other similar methods.

Figure 6D:
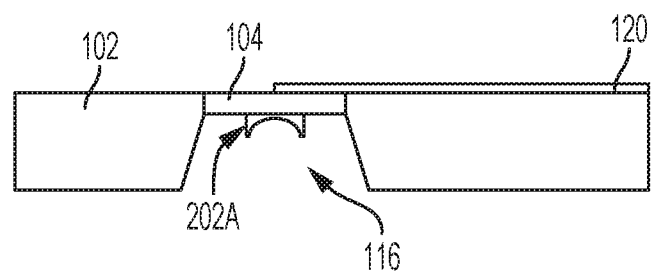

FIG. 6D illustrates adding/attaching the high-reflectivity mirror 202A onto the mechanical resonator 104. In one implementation, the mirror 202A may be designed for use at a single wavelength, comprising a Bragg stack of dielectric thin films of alternating refractive index such as $SiO_2/Ta_2O_5$. In one implementation, the mirror 202A may comprise the mechanical resonator 104 itself. Also, the mirror 202A may be formed onto the mechanical resonator 104 by thin-film deposition, lithographic patterning and plasma etch or wet chemical etch, or the mirror 202A may be attached to the mechanical resonator 104 using a micromanipulator and adhesive, or by other methods.

Figure 6E:
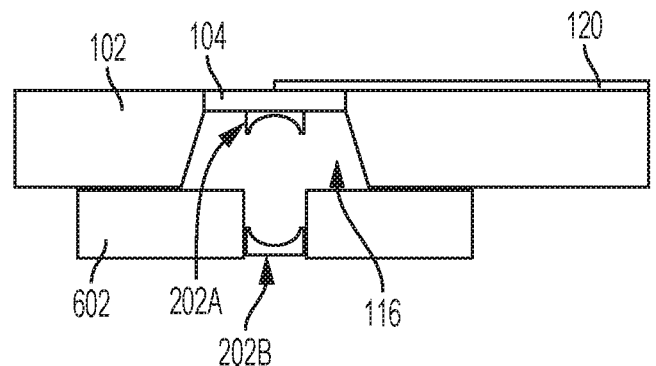

FIG. 6E illustrates an embodiment for forming the optical resonator 108 (i.e., optical cavity) by incorporation of a properly aligned fixed mirror 202B. The fixed mirror 202B may be a Bragg stack designed for single-wavelength operation and as needed may be larger or smaller, and higher or lower reflectivity, than the moving mirror 202A. The fixed mirror 202B may be formed by direct deposition onto the tip of an optical fiber 214 or may be a free standing mirror for application of a free-space optical beam. The alignment may be achieved using a movable positioner or self-aligned patterned substrate pieces 602 or by other means. Following this operation, the frequency conversion device is prepared into a package including microwave and optical-fiber connectors.

Figure 7:
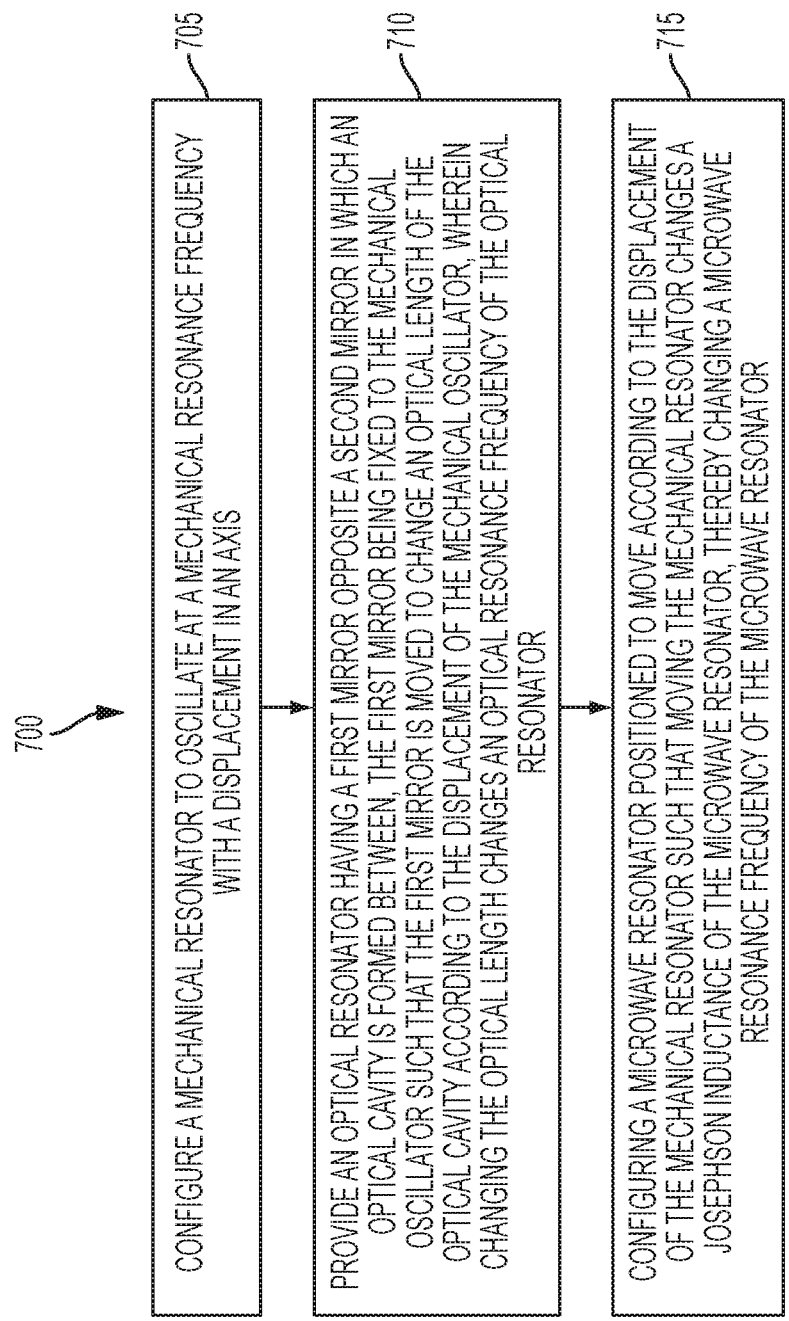
FIG. 7 is a flow chart of a method of configuring a frequency conversion apparatus according to an embodiment.

FIG. 7 is a flow chart 700 of a method of configuring a frequency conversion apparatus 100 according to an embodiment.

At block 705, the mechanical resonator 104 is configured to oscillate at a mechanical resonance frequency for the operation of the device, and to oscillate in a direction that has the proper alignment to the other components of the device and to the magnetic fields within the device, according to the given embodiment. For example, the mechanical resonator 104 may oscillate in the z-axis with a frequency of 1 MHz.

At block 710, according to an embodiment, the optical resonator 108 is configured to have a first mirror 202A opposite a second mirror 202B in which an optical cavity is formed in between, and the first mirror 202A is fixed to the mechanical resonator 104 such that the first mirror 202A is moved to change an optical length L of the optical cavity according to the displacement of the mechanical resonator 104, where changing the optical length L changes (i.e., shifts) an optical resonance frequency of the optical resonator 108.

At block 715, a SQUID 118 or pickup coil 502 is positioned to move according to the displacement of the mechanical resonator 104 such that moving the mechanical resonator 104 changes the inductance of the SQUID. The SQUID is incorporated into the microwave resonator 120, thereby changing (i.e., shifting) a microwave resonance frequency of the microwave resonator 120.

The mechanical resonator 104 (e.g., cantilever) is affixed to the substrate 102 such that the mechanical resonator 104 is free to oscillate in the z direction.

The microwave resonator 120 is positioned so that the SQUID 118 or pickup coil 502 can lie in the region of a magnetic field B having components in the x and z directions (i.e., $B_x$ and $B_z$). The flexural motion of the mechanical resonator causes the orientation of the SQUID loop or pickup coil relative to the magnetic field to vary, thereby varying the amount of magnetic flux in the SQUID loop. This variation of flux thereby causes the Josephson inductance of the SQUID to vary, and thereby causes the resonance frequency of the microwave resonator to vary.

The microwave resonator 120 comprises a superconducting quantum interference device (SQUID) 112 connected to a capacitor 110. The SQUID 112 is configured on the mechanical resonator such that the displacement of the mechanical resonator is configured to change a magnitude of a magnetic flux within the SQUID 112 in order to correspondingly change the Josephson inductance in the SQUID, thereby changing the microwave resonance frequency of the microwave resonator 120.

According to an embodiment, the first mirror 202A and the SQUID 118 or pickup coil 502 are fixed to the mechanical resonator 104 such that the displacement of the mechanical resonator 104 simultaneously changes both the optical resonance frequency via the first mirror 202A and the microwave resonance frequency via changing the Josephson inductance in the SQUID 112. The oscillation of the mechanical resonator 104 is configured to cause a microwave signal at a microwave frequency (input via the feedline 106) to be converted to an optical signal at an optical frequency (to be output via mirror 202B). Conversely, the oscillation of the mechanical resonator 104 is configured to cause an optical signal at an optical frequency (input via the mirror 202B) to be converted to a microwave signal at a microwave frequency (to be output via the feedline 106).

An optical pump tone adds energy to the optical resonator and the mechanical resonator, and a microwave pump tone adds energy to the microwave resonator and the mechanical resonator. A frequency conversion process of converting the microwave signal to the optical signal is unitary such that both energy and phase of information is persevered. A frequency conversion process of converting the optical signal to the microwave signal is unitary such that both energy and phase of information is persevered. The microwave resonator, the optical resonator, and the mechanical resonator are configured to covert single microwave photons to single optical photons and (likewise) to convert single optical photons into single microwave photons.

The displacement of the mechanical resonator is configured to shift a position, angle, or orientation of the SQUID such that the total magnetic flux in the SQUID has a changing magnitude according to the displacement of the mechanical resonator, and the changing magnitude of the total magnetic flux is configured to correspondingly change the Josephson inductance in the SQUID, thereby changing the microwave resonance frequency of the microwave resonator With reference to FIG. 4, another SQUID 118_2 is positioned to move according to the displacement of the mechanical resonator 104 such that moving the other SQUID 118_2 changes the inductance of the other microwave resonator 120_2, thereby changing the microwave resonance frequency of the other microwave resonator 120_2. The microwave resonator 120_1 is capacitively connected to a feedline 106_1 in order to select the microwave resonator 120_1 for coupling to the optical resonator 108. The other microwave resonator 120_2 is capacitively connected to another feedline 106_2 in order to select the other microwave resonator 120_2 for coupling to the optical resonator 108.

Figure 8A:
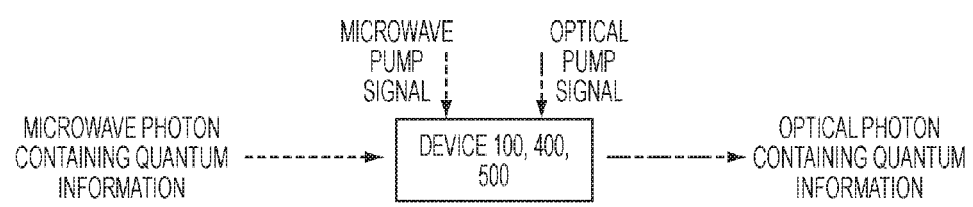
FIG. 8A is a diagram illustrating frequency upconversion according to an embodiment.

FIG. 8A is a black box diagram illustrating the concept of the frequency conversion device 100, 400, 500 upconverting the microwave photon containing quantum information into the optical photon containing the quantum information according to an embodiment. To operate the frequency conversion device 100, 400, 500, an information-carrying microwave photon signal is input to the device which coherently converts the microwave photon signal to an optical photon signal emitted by the frequency conversion device 100, 400, 500. Optical and microwave pump tones are applied to the frequency conversion device 100, 400, 500 to enhance and control the operation.

Figure 8B:
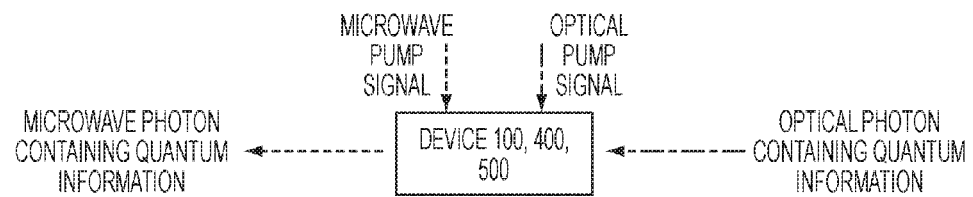
FIG. 8B is a diagram illustrating frequency downconversion according to an embodiment.

Conversely, FIG. 8B is a black box diagram illustrating the concept of the frequency conversion device 100, 400, 500 downconverting the optical photon containing quantum information into the microwave photon containing quantum information according to an embodiment. To operate the frequency conversion device 100, 400, 500, an information-carrying optical photon signal is input to the device which coherently converts the optical photon signal to a microwave photon signal emitted by the frequency conversion device

100, 400, 500. Again, optical and microwave pump tones are applied to the device to enhance and control the operation.

FIG. 9A is a schematic of a frequency spectrum diagram of the frequencies and linewidths of mechanical, microwave, and optical resonances in the frequency conversion device according to an embodiment. Example values are shown but it is appreciated that the values may be modified. FIG. 9B is a schematic illustrating approximate frequency positioning of the microwave and optical pump tones and converted signals according to an embodiment.

FIG. 9A shows in a frequency spectrum diagram the three resonances: mechanical 902, microwave 904, and optical 906. These may be characterized by their respective angular resonance frequencies $\omega_m$ (mechanical), $\omega_e$ (microwave) and $\omega_o$ (optical), as well as their three resonance linewidths $\kappa_m$ (mechanical), $\kappa_e$ (microwave) and $\kappa_o$ (optical), as understood by one skilled in the art. FIG. 9B shows in frequency space, relative to the three resonance frequencies and three resonance linewidths, approximately where the microwave pump and microwave signal, and the optical pump and optical signal should be positioned in frequency space, in order to facilitate the operation of the frequency-conversion device according to an embodiment.

Further details of principles of the frequency conversion device 100, 400, 500 are provided below. For ease of understanding, subheadings are utilized. It is understood that the subheadings are for explanation purposes and not limitation The Dependence of the Microwave Resonance Frequency on the Flux Bias With the assumption that the SQUIDs are small, $LI_0 \ll \Phi_0/2$ where $$\Phi_0 = \frac{h}{2e}$$

(flux quantum). The geometric inductance of the SQUID loop is L, and $I_0$ is the critical current of the Josephson junction. The dependence of the Josephson junction inductance on the flux threading the loop is $$L_J(\Phi') = \frac{L_{J0}}{|\cos\Phi'|}$$

where $$L_{J0} = \frac{\hbar}{4eI_0}$$

and $$\Phi' = \frac{\pi\Phi_{ext}}{\Phi_0} = \frac{\pi(\Phi_b + \delta\Phi)}{\Phi_0}.$$

The applied flux working point is $\Phi_b$ and the flux variation due to the mechanical motion is $\delta\Phi$.

The angular resonance frequency of the microwave resonator is given by $$\omega_{res}(\Phi') = \frac{1}{\sqrt{C[NL_J(\Phi') + L_s]}},$$

where C is the capacitance of the resonator, where $L_s$ is the stray inductance of the resonator (other than the inductances of the Josephson junctions and the SQUID loops) and N is the number of SQUID loops in the array.

The Dependence of the Microwave Resonance Frequency on the Mechanical Motion

In the limit of very small displacement of the cantilever, the angular resonance frequency of the microwave resonator can be written as $$\omega_{res} = \omega_{res}^0 + \frac{d\omega_{res}}{dz}\bigg|_{z=0} z + O(z^2),$$

where the frequency $$\omega_{res}^0 = \omega_{res}\left(\frac{\pi\Phi_b}{\Phi_0}\right)$$

is the mean resonance frequency in the absence of mechanical motion and z is the amplitude of the mechanical motion.

The shift in the angular resonance frequency due to the vertical displacement of the mechanical resonator (cantilever) is $$\frac{d\omega_{res}}{dz} = \frac{d\omega_{res}}{d\phi'}\frac{d\Phi'}{dz}.$$

The first derivative can be expressed as $$\frac{d\omega_{res}}{d\Phi'} = \frac{d\omega_{res}}{dL_J}\frac{dL_J}{d\Phi'},$$

where $$\frac{d\omega_{res}}{dL_J} = \frac{-CN}{2(C[NL_J(\Phi') + L_s])^{3/2}}$$

and $$\frac{dL_J}{d\Phi'} = L_{J0}\frac{\tan\Phi'}{\cos\Phi'}.$$

The Electromechanical Coupling Rate $$\frac{d\omega_{res}}{dz} = \frac{d\omega_{res}}{d\Phi'}\frac{d\Phi'}{dz},$$

The electromechanical coupling strength is given by $$\frac{d\omega_{res}}{d\Phi'}\bigg|_{z=0} = -\frac{\omega_{res}^0}{2} \frac{L_{J0}}{L_J\left(\frac{\pi\Phi_b}{\Phi_0}\right) + \frac{L_S}{N}} \frac{\tan\frac{\pi\Phi_b}{\Phi_0}}{\cos\frac{\pi\Phi_b}{\Phi_0}}.$$

where For $$\Phi_b = \frac{\Phi_0}{3}, \text{ then } \frac{d\omega_{res}}{d\Phi'}\bigg|_{z=0} \cong -1.73\, \omega_{res}^0 \frac{L_{J0}}{2L_{J0} + \frac{L_S}{N}}.$$

For N=2 and w=l/2, then $$\frac{d\Phi'}{dz} = \frac{\pi}{\Phi_0} B_x \frac{w}{2}.$$

For $B_x=10^{-3}$ T (10 G) and w=50 μm, then $$\frac{d\Phi'}{dz} = 3.93 \cdot 10^7 \frac{T}{m}.$$

It is assumed that $\omega_{res}^0/2\pi=7$ GHz, $L_s=0.1$ nH, $z_{zpf}=5\cdot10^{-16}$ m, such that $I_0=1$ μA and $L_{J0}=0.17$ nH. At $$\Phi_b = \frac{\Phi_0}{3},$$

the SQUID inductance is 0.34 nH.

The coupling constant is $$\frac{g_{e0}}{2\pi} = \frac{1}{2\pi}\frac{d\omega_{res}}{dz}z_{ZPF} = \frac{1}{2\pi}\frac{d\omega_{res}}{d\Phi'}\frac{d\Phi'}{dz}z_{ZPF} = 112 \text{ Hz}.$$

The Microwave Resonator can have Very Low Loss

It is assumed that the microwave resonator is operating in the resolved-sideband limit where $4\omega_m \gg \kappa_{e,o}$ and $\kappa_{e,o} \gg g_{e,o}$. Here, $\kappa_{e,o}$ is the linewidth of the microwave (e) or optical (o) resonance and $g_{e,o}$ is the coupling constant between microwave (e) resonator and mechanical motion, or between optical (o) resonator and mechanical motion. Thus, for $\omega_m/2\pi=1$ MHz, we set $\kappa_e/2\pi$ to be 1 MHz, which for $\omega_{res}^0/2\pi=7$ GHz, gives $Q_{ext}=7000$. Here $Q_{ext}$ is the quality factor of the microwave resonator with regard to external circuitry. The microwave resonator capacitance in this design example is set to be C=1.2 pF and the coupling capacitance with regard to the microwave signal feedline is set to be $C_c=8.8$ fF. One particular requirement is that $Q_i \gg Q_{ext}$, where $Q_{ext}$ is the external quality factor and $Q_i$ is the internal quality factor. As a feasibility proof, it has been shown that $Q_i$ of a superconducting resonator with C~2 pF (implemented as a plate capacitor using single crystal silicon as the dielectric layer) resonating in the range 4-6.5 GHz can be as high as $Q_i=2\cdot 10^5$ in the single photon excitation regime at 20 mK.

Bound on the Electromechanical Conversion Rate

In order to enhance the coupling constant, one can apply a strong non-resonant microwave pump tone that is red-shifted from the microwave cavity resonance (i.e., the microwave resonator resonance) by the resonance frequency of the mechanical resonator. This pump tone sets the magnitude of the microwave-to-mechanical coupling constant $g_e = g_{e0}\sqrt{n_e}$, where $n_e$ is the number of photons present in the microwave resonator due to the applied pump tone, and $g_{e0}$ is the minimum microwave-to-mechanical coupling that exists at the level of the zero-point motion of the mechanical resonator.

In order to obtain an upper bound on the maximum coupling constant that can be achieved, we substitute in the expression for $g_e$ an estimate for the maximum number of photons that can be applied to the microwave resonator (above which the Josephson junctions are driven into the voltage state) $n_e \sim 10^5$. This gives the upper bound $$\frac{g_e}{2\pi} \le 35 \text{ kHz.}$$

It is noted that a tighter bound can be found by considering the onset of nonlinearity exhibited by the Josephson junctions due to large microwave drives.

Subsequently, this yields an upper bound on the frequency conversion rate which in the resolved-sideband limit is given by $$\Gamma_e = \frac{4g_e^2}{\kappa_e}$$

such that $$\frac{\Gamma_e}{2\pi} \le 4.9 \text{ kHz.}$$

The Apparent Photon Number Efficiency for the Upconversion/Downconversion Process The apparent photon number efficiency for the upconversion/downconversion process in the resolved-sideband limit condition $4\omega_m \gg \kappa_e$, $\kappa_o$ is given by $$S_{oe}(\omega) = S_{eo}(\omega) = \frac{\sqrt{\Gamma_e \Gamma_o}}{-i(\omega - \omega_m) + (\Gamma_e + \Gamma_o + \kappa_m)/2} \times \sqrt{A\eta_e\eta_o}$$

where $A = A_e A_o$ is the total conversion gain, $$A_e = 1 + \left(\frac{\kappa_e}{4\omega_m}\right)^2$$

is the microwave circuit gain, $$A_o = 1 + \left(\frac{\kappa_o}{4\omega_m}\right)^2$$

is the optical circuit gain, $\kappa_m$ is the intrinsic mechanical damping, $$\eta_e = \frac{\kappa_{e,ext}}{\kappa_e}$$

and $$\eta_o = \epsilon \frac{\kappa_{o,ext}}{\kappa_o}$$

represent the fraction of energy that exits the microwave and optical resonators into propagating modes respectively, $\kappa_{e,ext}$ and $\kappa_{o,ext}$ are the rates at which energy leaves the microwave and optical resonators into propagating modes respectively, and $\in$ is the optical mode matching.

As can be seen from $$S_{oe}(\omega) = S_{eo}(\omega) = \frac{\sqrt{\Gamma_e \Gamma_o}}{-i(\omega - \omega_m) + (\Gamma_e + \Gamma_o + \kappa_m)/2} \times \sqrt{A\eta_e\eta_o},$$

one can obtain upconversion/downconversion efficiencies $S_{oe}(\omega), S_{eo}(\omega)$ on the mechanical resonance $\omega = \omega_m$ that are close to unity if the device satisfies the following conditions.

(1) The frequency conversion device operates in the resolved-sideband limit, which yields gains $A_{e,0} \approx 1$.

(2) Conversion rates $\Gamma_e$, $\Gamma_o$ are matched $\Gamma_e = \Gamma_o$.

(3) Mechanical loss $\kappa_m$ is negligible compared to conversion rates $\Gamma_e$, $\Gamma_o$.

(4) Both $\eta_e$, $\eta_0$ are close to unity, i.e., both resonators are strongly coupled, have low internal loss, and matching parameter E approaches unity for the optical cavity. Here the symbols $\eta_e$ and $\eta_o$ represent the fractions of microwave and optical energy, respectively, that are collected by feedline or optical fiber, after leaving the microwave or optical resonators.

Example Scheme of Using the Frequency Conversion Device

Typical numerical values are assumed for the proposed scheme of using the frequency conversion device. The typical numerical values include mechanical resonator frequency $$\frac{\omega_m}{2\pi} = 1 \text{ MHz,}$$

mechanical resonator quality factor $Q_i^m = 30,000$, microwave resonator frequency $\omega_e/2\pi = 7$ GHz, microwave resonator external quality factor $Q_{ext}^e = 7000$, microwave resonator internal quality factor $Q_i^e = 100,000$, optical resonance frequency $$\frac{\omega_o}{2\pi} = 282 \text{ THz,}$$

optical resonator external quality factor $Q_{ext}^o = 355,000,000$, optical resonator internal quality factor $Q_i^o = 76$ billion, and optomechanical and electromechanical conversion rates $$\frac{\Gamma_o}{2\pi} = \frac{\Gamma_e}{2\pi} = 1 \text{ kHz.}$$

The typical numerical values include mechanical resonator linewidth $$\frac{\kappa_m}{2\pi} = 33 \text{ Hz,}$$

microwave resonator quality factor $Q_{tot}^e = 6500$, optical resonator quality factor $Q_{tot}^o = 353,000,000$, microwave resonator linewidth $$\frac{\kappa_e}{2\pi} = 1.1 \text{ MHz,}$$

optical resonator linewidth $$\frac{\kappa_o}{2\pi} = 0.8 \text{ MHz,}$$

microwave circuit gain $A_e = 1.08$, optical circuit gain $A_o = 1.04$, microwave coupling efficiency $\eta_e = 0.93$, and optical coupling efficiency $\eta_o = 0.99 \in$, where $\in \sim 1$ reasonable if mirrors are large compared to laser beam size. Accordingly, $S_{oe}(\omega_m)$, $S_{eo}(\omega_m) = 0.98\sqrt{1.03 \cdot \in} = 0.99 \times \sqrt{\in}$, which is very close to unity (or may be considered unity with respect to frequency conversion).

It will be noted that various microelectronic device fabrication methods may be utilized to fabricate the components/elements discussed herein as understood by one skilled in the art. In superconducting and semiconductor device fabrication, the various processing steps fall into four general categories: deposition, removal, patterning, and modification of electrical properties.

Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others.

Removal is any process that removes material from the wafer: examples include etch processes (either wet or dry), and chemical-mechanical planarization (CMP), etc.

Patterning is the shaping or altering of deposited materials, and is generally referred to as lithography. For example, in conventional lithography, the wafer is coated with a chemical called a photoresist; then, a machine called a stepper focuses, aligns, and moves a mask, exposing select portions of the wafer below to short wavelength light; the exposed regions are washed away by a developer solution. After etching or other processing, the remaining photoresist is removed. Patterning also includes electron-beam lithography.

The flowchart and block diagrams in FIGS. 3, 7 and 8 illustrate the architecture, functionality, and operation of possible implementations of systems and methods. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A frequency conversion apparatus comprising:
    a mechanical resonator configured to oscillate at a mechanical resonance frequency with a displacement in an axis;
    an optical resonator including a first mirror opposite a second mirror in which an optical cavity is formed between, the first mirror being fixed to the mechanical resonator such that the first mirror is moved to change an optical length of the optical cavity according to the displacement of the mechanical resonator, wherein changing the optical length changes an optical resonance frequency of the optical resonator; and
    a microwave resonator positioned to move according to the displacement of the mechanical resonator such that moving the mechanical resonator changes a Josephson inductance of the microwave resonator, thereby changing a microwave resonance frequency of the microwave resonator.

2. The frequency conversion apparatus of claim 1, further comprising a substrate, wherein the mechanical resonator is affixed to the substrate such that the mechanical resonator is free to oscillate.

3. The frequency conversion apparatus of claim 2, wherein the substrate comprises a hole beneath the mechanical resonator such that two sides of the mechanical resonator are exposed or accessible.

4. The frequency conversion apparatus of claim 1, wherein the microwave resonator incorporates a superconducting quantum interference device (SQUID); and
    wherein the SQUID is positioned to move according to the displacement of the mechanical resonator such that moving the mechanical resonator changes the Josephson inductance of the SQUID.

5. The frequency conversion apparatus of claim 4, wherein the SQUID is positioned on the mechanical resonator in the presence of a magnetic field received in two separate components simultaneously from one or more magnetic-field-producing devices;
    wherein a total magnetic field received by the SQUID on the mechanical resonator generates a total magnetic flux threading the SQUID.

6. The frequency conversion apparatus of claim 5, wherein the displacement of the mechanical resonator is configured to shift a position, angle, or orientation of the SQUID such that the total magnetic flux in the SQUID has a changing magnitude according to the displacement of the mechanical resonator;
    wherein the changing magnitude of the total magnetic flux is configured to correspondingly change the Josephson inductance in the SQUID, thereby changing the microwave resonance frequency of the microwave resonator.

7. The frequency conversion apparatus of claim 4, wherein the SQUID is a DC SQUID including two or more Josephson junctions within a superconducting loop; and
    wherein the SQUID is configured on the mechanical resonator such that the displacement of the mechanical resonator is configured to change the total magnetic flux received by the SQUID in order to correspondingly change the Josephson inductance in the SQUID, thereby changing the microwave resonance frequency of the microwave resonator.

8. The frequency conversion apparatus of claim 4, wherein the displacement of the mechanical resonator simultaneously changes both:
    the optical resonance frequency of the optical resonator by changing the optical length of the optical cavity, and
    the microwave resonance frequency of the microwave resonator by changing the Josephson inductance in the SQUID.

9. The frequency conversion apparatus of claim 1, wherein the displacement of the mechanical resonator is configured to cause a microwave signal at a microwave frequency to be converted to an optical signal at an optical frequency; and
    wherein the displacement of the mechanical resonator is configured to cause an optical signal at an optical frequency to be converted to a microwave signal at a microwave frequency.

10. The frequency conversion apparatus of claim 1, further comprising a second microwave resonator positioned to move according to the displacement of the mechanical resonator such that moving the second microwave resonator changes a second Josephson inductance of the second microwave resonator, thereby changing the microwave resonance frequency of the second microwave resonator.

11. The frequency conversion apparatus of claim 10, wherein the microwave resonator is capacitively connected to a feedline in order to select the microwave resonator for coupling to the optical resonator;
    wherein the second microwave resonator is capacitively connected to another feedline in order to select the second microwave resonator for coupling to the optical resonator; and
    wherein the feedline and the other feedline carry input and output fields.

12. A method of configuring a frequency conversion apparatus, the method comprising:
    configuring a mechanical resonator to oscillate at a mechanical resonance frequency with a displacement in an axis;
    providing an optical resonator configured such that a motion of the mechanical resonator changes an optical length of the optical cavity according to the displacement of the mechanical resonator, wherein changing the optical length changes an optical resonance frequency of the optical resonator, wherein the optical resonator includes a first mirror opposite a second mirror in which the optical cavity is formed between, the first mirror being fixed to the mechanical resonator such that the motion of the first mirror changes the optical length; and
    configuring a microwave resonator positioned to move according to the displacement of the mechanical resonator such that moving the mechanical resonator changes a Josephson inductance of the microwave resonator, thereby changing a microwave resonance frequency of the microwave resonator.

13. The method of claim 12, wherein the mechanical resonator is affixed to a substrate and allowed to freely vibrate while attached to the substrate.

14. The method of claim 12, wherein the microwave resonator incorporates a SQUID;
wherein the SQUID is positioned on the mechanical resonator in the presence of a magnetic field applied in two orthogonal directions simultaneously from one or more magnetic-field sources;
wherein a total magnetic field received by the SQUID on the mechanical resonator generates a total magnetic flux threading the SQUID.

15. The method of claim 14, wherein an angle, orientation, or position of the SQUID is configured to vary according to the displacement of the mechanical resonator, thereby changing the total magnetic flux that the total magnetic field produces within the SQUID;
wherein changing the total magnetic flux in the SQUID correspondingly changes the Josephson inductance in the SQUID, thereby changing the microwave resonance frequency of the microwave resonator.

16. The method of claim 12, wherein the microwave resonator comprises a SQUID connected to a capacitor.

17. The method of claim 16, wherein the optical cavity and the SQUID are fixed to the mechanical resonator such that the displacement of the mechanical resonator simultaneously:
changes the optical resonance frequency by changing the optical length of the optical cavity, and
changes the microwave resonance frequency by changing the Josephson inductance of the SQUID.

18. The method of claim 12, wherein the displacement of the mechanical resonator is configured to cause a microwave signal at a microwave frequency to be converted to an optical signal at an optical frequency; and
wherein the displacement of the mechanical resonator is configured to cause the optical signal at the optical frequency to be converted to the microwave signal at the microwave frequency.

19. The method of claim 18, wherein an optical pump tone adds energy to the optical resonator and the mechanical resonator; and
wherein a microwave pump tone adds energy to the microwave resonator and the mechanical resonator.

20. The method of claim 18, wherein a frequency conversion process of converting the microwave signal to the optical signal is unitary such that both energy and phase of information is persevered;
wherein a frequency conversion process of converting the optical signal to the microwave signal is unitary such that both energy and phase of information is persevered.

21. The method of claim 12, wherein the microwave resonator, the optical resonator, and the mechanical resonator are configured to convert single microwave photons to single optical photons and to convert the single optical photons into single microwave photons.

22. The method of claim 12, wherein a second microwave resonator is positioned to move according to the displacement of the mechanical resonator such that moving the second microwave resonator changes the Josephson inductance of the second microwave resonator, thereby changing the microwave resonance frequency of the second microwave resonator simultaneously with changing the microwave resonance frequency of the microwave resonator.

23. The method of claim 22, wherein the microwave resonator is capacitively connected to a feedline in order to select the microwave resonator for coupling to the optical resonator;
wherein the second microwave resonator is capacitively connected to another feedline in order to select the second microwave resonator for coupling to the optical resonator; and
wherein the feedline and the another feedline carry input and output fields.

24. A frequency conversion apparatus comprising:
a mechanical resonator configured to oscillate at a mechanical resonance frequency with a displacement in an axis;
an optical resonator configured such that the displacement of the mechanical resonator changes an optical length of the optical resonator, the optical resonator including a first mirror opposite a second mirror in which an optical cavity is formed between, the first mirror being fixed to the mechanical resonator such that the first mirror is moved to change the optical length of the optical cavity, wherein changing the optical length changes an optical resonance frequency of the optical resonator; and
a pickup coil positioned to move according to the displacement of the mechanical resonator such that moving the pickup coil changes a total magnetic flux received by the pickup coil, wherein the pickup coil is in a circuit in which a current changes according to changes in the total magnetic field;
an input coil connected to the pickup coil via the circuit such that changing the total magnetic flux creates a secondary total magnetic field in the input coil, as a result of changing the current in the circuit; and
a SQUID that is both coupled to the input coil and incorporated into a microwave resonator, such that changing the secondary total magnetic field changes a Josephson inductance of the SQUID, wherein changing the Josephson inductance changes a microwave resonance frequency of the microwave resonator.

25. The frequency conversion apparatus of claim 24, wherein the microwave resonator comprises the SQUID connected to a capacitor; and
wherein the SQUID and the microwave resonator are not positioned on the mechanical resonator.

* * * * *